US008661032B2

(12) United States Patent  
Otten et al.

(10) Patent No.: US 8,661,032 B2  
(45) Date of Patent: Feb. 25, 2014

(54) VOCABULARY ENGINE

(75) Inventors: Hans Otten, Ilderton (CA); Christoph Alexander Wedermann, London (CA)

(73) Assignee: Autodata Solutions Company, London (CA)

(*) Notice: Subject to any disclaimer, the term of this patent is extended or adjusted under 35 U.S.C. 154(b) by 506 days.

(21) Appl. No.: 12/200,231

(22) Filed: Aug. 28, 2008

(65) Prior Publication Data

US 2010/0057294 A1    Mar. 4, 2010

(51) Int. Cl.
  *G06F 7/00*    (2006.01)
  *G06F 17/30*    (2006.01)
(52) U.S. Cl.
  USPC .............................................. 707/731; 701/24
(58) Field of Classification Search
  None
  See application file for complete search history.

(56) References Cited

U.S. PATENT DOCUMENTS

| | | | |
|---|---|---|---|
| 5,568,406 A * | 10/1996 | Gerber | 702/159 |
| 6,208,919 B1 * | 3/2001 | Barkesseh et al. | 701/35 |
| 6,550,052 B1 * | 4/2003 | Joyce et al. | 717/100 |
| 6,668,253 B1 * | 12/2003 | Thompson et al. | 1/1 |
| 7,120,646 B2 | 10/2006 | Streepy, Jr. | |
| 7,216,094 B2 * | 5/2007 | Ly et al. | 705/26.5 |
| 7,426,481 B1 * | 9/2008 | Connors et al. | 705/26.5 |
| 7,865,409 B1 * | 1/2011 | Monaghan | 705/28 |
| 2002/0023076 A1 * | 2/2002 | Shishido | 707/1 |
| 2002/0059283 A1 * | 5/2002 | Shapiro et al. | 707/100 |
| 2002/0098853 A1 * | 7/2002 | Chrumka | 455/456 |
| 2002/0128874 A1 * | 9/2002 | McIntosh et al. | 705/4 |
| 2002/0128876 A1 * | 9/2002 | Mahoney et al. | 705/4 |
| 2003/0158759 A1 * | 8/2003 | Kannenberg | 705/4 |
| 2004/0111487 A1 * | 6/2004 | Hooks | 709/217 |
| 2004/0176905 A1 * | 9/2004 | Sanqunetti et al. | 701/200 |
| 2004/0214526 A1 * | 10/2004 | Tajima et al. | 455/41.2 |
| 2005/0065678 A1 * | 3/2005 | Smith et al. | 701/29 |
| 2005/0107925 A1 * | 5/2005 | Enigk et al. | 701/1 |
| 2005/0143883 A1 * | 6/2005 | Yamagiwa | 701/32 |
| 2005/0154500 A1 * | 7/2005 | Sonnenrein et al. | 701/1 |
| 2005/0182534 A1 * | 8/2005 | Legate et al. | 701/29 |
| 2005/0187680 A1 * | 8/2005 | Kamdar et al. | 701/29 |
| 2006/0007003 A1 * | 1/2006 | Yamagiwa | 340/572.1 |
| 2006/0020477 A1 * | 1/2006 | Retzbach et al. | 705/1 |
| 2006/0146719 A1 * | 7/2006 | Sobek et al. | 370/238 |
| 2006/0149635 A1 * | 7/2006 | Bhatti et al. | 705/23 |
| 2006/0173873 A1 * | 8/2006 | Prompt et al. | 707/100 |
| 2006/0271255 A1 * | 11/2006 | Stott et al. | 701/29 |

(Continued)

OTHER PUBLICATIONS

Young, Ohad et al.; "Applying Hybrid-Asbru Clinical Guidelines Using the Spock System"; Proceedings of the AMIA Annual Symposium; 2005; pp. 854 to 858; vol. 2005 Available from http://www.pubmedcentral.nih.gov/articlerender.fcgi?artid=1560650.

(Continued)

*Primary Examiner* — Augustine K Obisesan  
(74) *Attorney, Agent, or Firm* — Brett J. Slaney; Santosh K. Chan; Blake, Cassels & Graydon LLP

(57) ABSTRACT

A system and method are provided for generating an output comprising data pertaining to a vehicle. A set of vehicle data pertaining to a selected vehicle is requested and the vehicle data is obtained from a database. The vehicle data is stored, e.g. using a hash map and a script generated outside of the system is obtained, which defines the structure of the output. The script is then run while using the vehicle data to generate the output and the output is provided to an application.

20 Claims, 12 Drawing Sheets

(56) References Cited

U.S. PATENT DOCUMENTS

| | | | |
|---|---|---|---|
| 2007/0250396 A1* | 10/2007 | Hallowell et al. | 705/26 |
| 2007/0276847 A1* | 11/2007 | Butler et al. | 707/100 |
| 2007/0282711 A1* | 12/2007 | Ullman et al. | 705/27 |
| 2008/0172258 A1* | 7/2008 | Weger et al. | 705/4 |
| 2008/0295130 A1* | 11/2008 | Worthen | 725/34 |
| 2008/0306646 A1* | 12/2008 | McDonald et al. | 701/29 |
| 2009/0132345 A1* | 5/2009 | Meyssami et al. | 705/10 |

OTHER PUBLICATIONS

Young, O. et al.; "The Spock System: Developing a Runtime Application Engine for Hybrid-Asbru Guidelines"; 2005; pp. 166 to 170; Lecture Notes in Computer Science; No. 3581; Springer-Verlag.

Rucker, Donald W. et al.; "Design and Use of a Joint Order Vocabulary Knowledge Representation Tier in a Multi-tier CPOE Architecture"; Proceedings of the AMIA Annual Symposium; 2006; pp. 669 to 673; vol. 2006 Available from http://www.pubmedcentral.nih.gov/articlerender.fcgi?artid=1839695.

Andre; Jacques E.; "The Industrial Forum"; 2002; Electronic Health Records and Communication for Better Health Care; F. Mennerat (Ed.); IOS Press.

Buntrock, James et al.; Vocabulary Services for caGrid Strategy and Technical Approach—White Paper; Oct. 19, 2006 Available from http://gforce.nci.nih.gov/docman/view.php/139/4977/20061019_vocabulary_services_caGrid_v1.doc.

* cited by examiner

VOCABULARY ENGINE

FIELD OF THE INVENTION

The invention relates to a system and method for generating an output comprising data pertaining to a vehicle.

BACKGROUND

Automobiles and other vehicles comprise many parts, components and features, which require a vast amount of data to describe the nature, importance and interrelation of such parts, components and features within the overall vehicle. For example, different vehicles may have different engines, which themselves may have different models comprising different components with corresponding parts and performance criteria that define such differences. This descriptive data can thus be difficult to compile and integrate into a useable form.

One problem with using descriptive data for a vehicle is the availability of the data itself. Another problem is that when such data exists, there is a need to have a mechanism to access the data so that it may be used in a consistent manner. Also, there can be the need for multiple entities to access the descriptive data.

It is therefore an object of the following, to obviate or mitigate the above-noted disadvantages.

SUMMARY OF THE INVENTION

In one aspect, there is provided a method for generating an output comprising data pertaining to a vehicle comprising requesting a set of vehicle data pertaining to a selected vehicle; obtaining the vehicle data; storing the vehicle data; obtaining a script defining the structure of the output; running the script using the vehicle data to generate the output; and providing the output to an application.

In another aspect, there is provided a computer readable medium comprising computer executable instructions for performing the method.

BRIEF DESCRIPTION OF THE DRAWINGS

An embodiment of the invention will now be described by way of example only with reference to the appended drawings wherein:

FIG. 8 is an exemplary screen shot of a vehicle configuration user interface utilizing an output from the runtime vocabulary engine.

FIG. 11 is a screen shot of the user interface of FIG. 9 displaying advantages associated with a comparison.

DETAILED DESCRIPTION OF THE DRAWINGS

It has been recognized that by separating the scripting language from a vocabulary engine used to generate a readable output pertaining to vehicle information, such vocabulary engine is capable of modifying and generating scripts at runtime which provides increased flexibility by allowing any suitable scripting language to be used, and enables the vocabulary engine to be deployed in a network or web-based environment in addition to stand-alone configurations. It has also been recognized that the use of hash maps to efficiently store vehicle data that is extracted from a database of vehicle data can improve performance further facilitating the deployment of the vocabulary engine in network and web-based environments. It has also been recognized that by separating the scripting language from the vocabulary engine, additional custom variables can be incorporated at runtime enabling net equipment views and the addition of branding information and to incorporate other business requirements at runtime.

Figure 1:
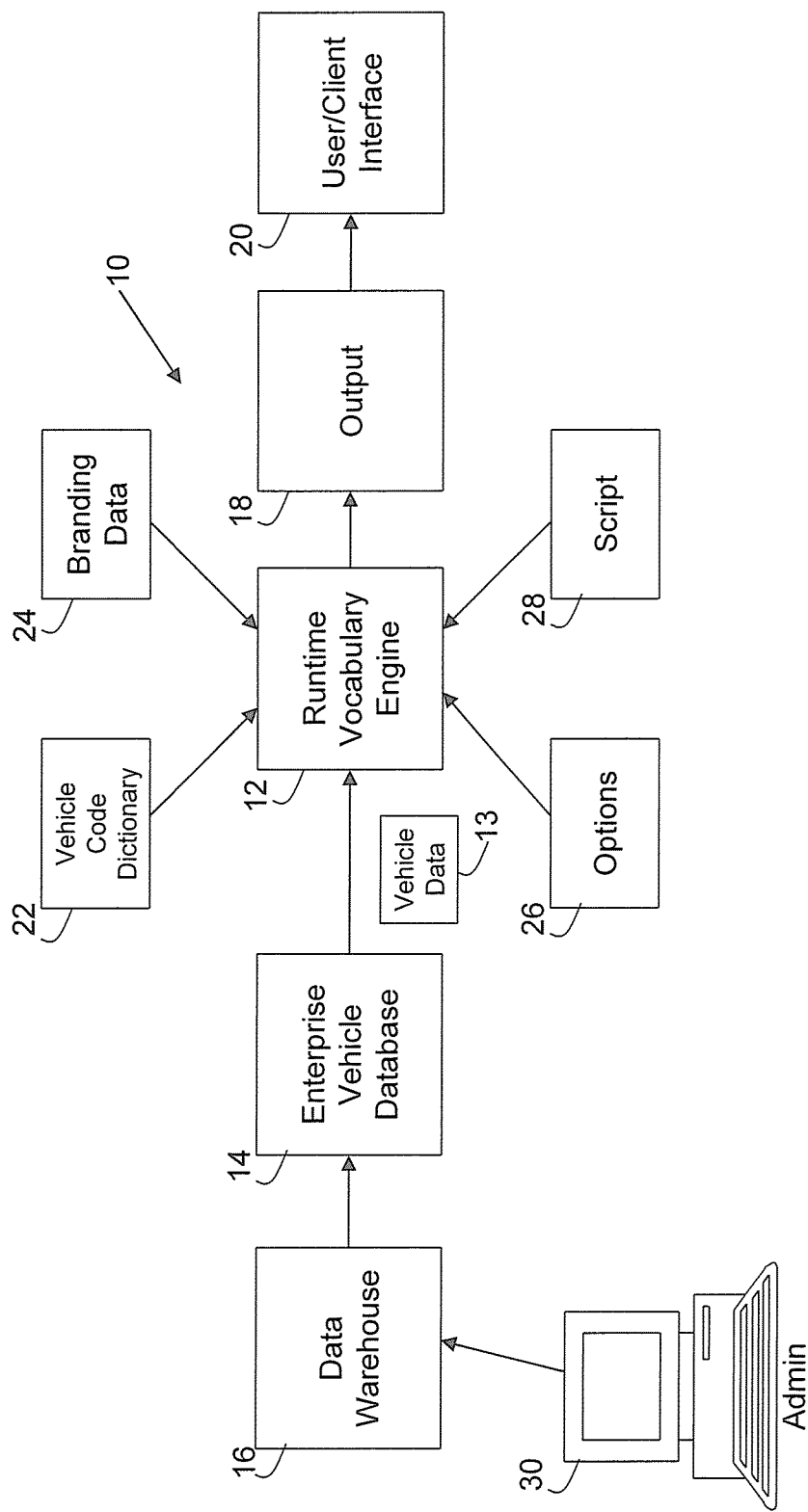
FIG. 1 is a block diagram illustrating one embodiment of a system for generating an output comprising data pertaining to a vehicle.

Turning now to the figures, FIG. 1 illustrates the workflow of a system for generating an output comprising data pertaining to a vehicle, which is generally denoted by numeral 10. The system 10 in this example utilizes a runtime vocabulary engine (RVE) 12 access data pertaining to a vehicle and generate an output 18 using such data that operates dynamically in an enterprise scalable environment while offering the flexibility of controlling the output 18 and level of detail of the data. As will be explained below, these capabilities are provided in a manner that can account for the current state of the application using the RVE 12 and enables the system 10 to be optimized for web or network-based performance. The RVE 12 may be implemented using a computer readable medium comprising computer executable instructions for generating the output 18.

The RVE 12 in this example, obtains vehicle data 13 from an enterprise vehicle database (EVD) 14, which obtains the vehicle data 13 from a data warehouse 16. The data warehouse 16 stores vehicle data 13 for each of a plurality of vehicles at an atomic level using comparison codes 78 (see also FIG. 2) that allow the attributes and parameters of one vehicle to be compared to the same attributes and parameters of another vehicle. The comparison codes 78, which will be explained in greater detail below are, conceptually speaking, questions about the vehicle that are answered for each vehicle, which is tracked and managed in the data warehouse 16 by one or more administrative entities 30. Since different applications may use the RVE 12 in different ways, with different formats, the common format used in the data warehouse 16 is packaged and exported in an appropriate format to the EVD 14. It will be appreciated that the data warehouse 16 and EVD 14 need not be separate entities, for example if an embodiment of the RVE 12 is configured to handle the format used by the data warehouse 16.

The RVE 12 utilizes the vehicle data 13 obtained from the EVD 14 and/or data warehouse 16 to generate a usable output 18 that presents the vehicle data 13 in a form that can be incorporated into a user or client interface 20 such as a web-based vehicle configuration program or in the generation of vehicle option description etc. The way in which the RVE 12 puts the vehicle data 13 together to generate the output 18 is according to a script 28. The script 28 is a computer readable file that comprises a set of instructions for assembling phrases, sentences, lists, paragraphs or any other usable form that can incorporate the vehicle data 13. The script 28 can be in any suitable script language, which allows scripts to be modified at runtime avoiding the need to pre-publish data to confirm the accuracy of the script 28. As an example, the script 28 may instruct the RVE 12 to insert the sunroof type into the sentence: "Option package A includes a [answer 88 to comparison code 78 inserted here] sunroof". If the sunroof type is glass, the sentence would be constructed to read. "Option package A includes a glass sunroof". Multiple phrases and sentences can be constructed in this way to generate the output 18 according to the instructions included in the script 28.

The RVE 12 also has access to a vehicle code dictionary 22, which comprises a guide to the structure of the comparison codes 78 so that the RVE 12 is able to request the appropriate vehicle data 13. The code dictionary 22 may store standard or base brand information such as a brand of speaker associated with a certain vehicle. However, the RVE 12 may also utilize additional brand data 24. For example, a particular application may wish to insert brand information for certain aspects of the vehicle that is not necessarily stored with the code dictionary 22 or to add information that is more current or associated with a promotion or special offer. In this way, a more dynamic output 18 can be created to accommodate different applications and more current scenarios as required by the application and the client or user implementing that application.

The RVE 12 also allows options 26 to be specified, which enables the output 18 to reflect standard equipment, optional equipment and even net equipment views that provide a comparison between two vehicles or two option packages of the same vehicle.

Figure 2:
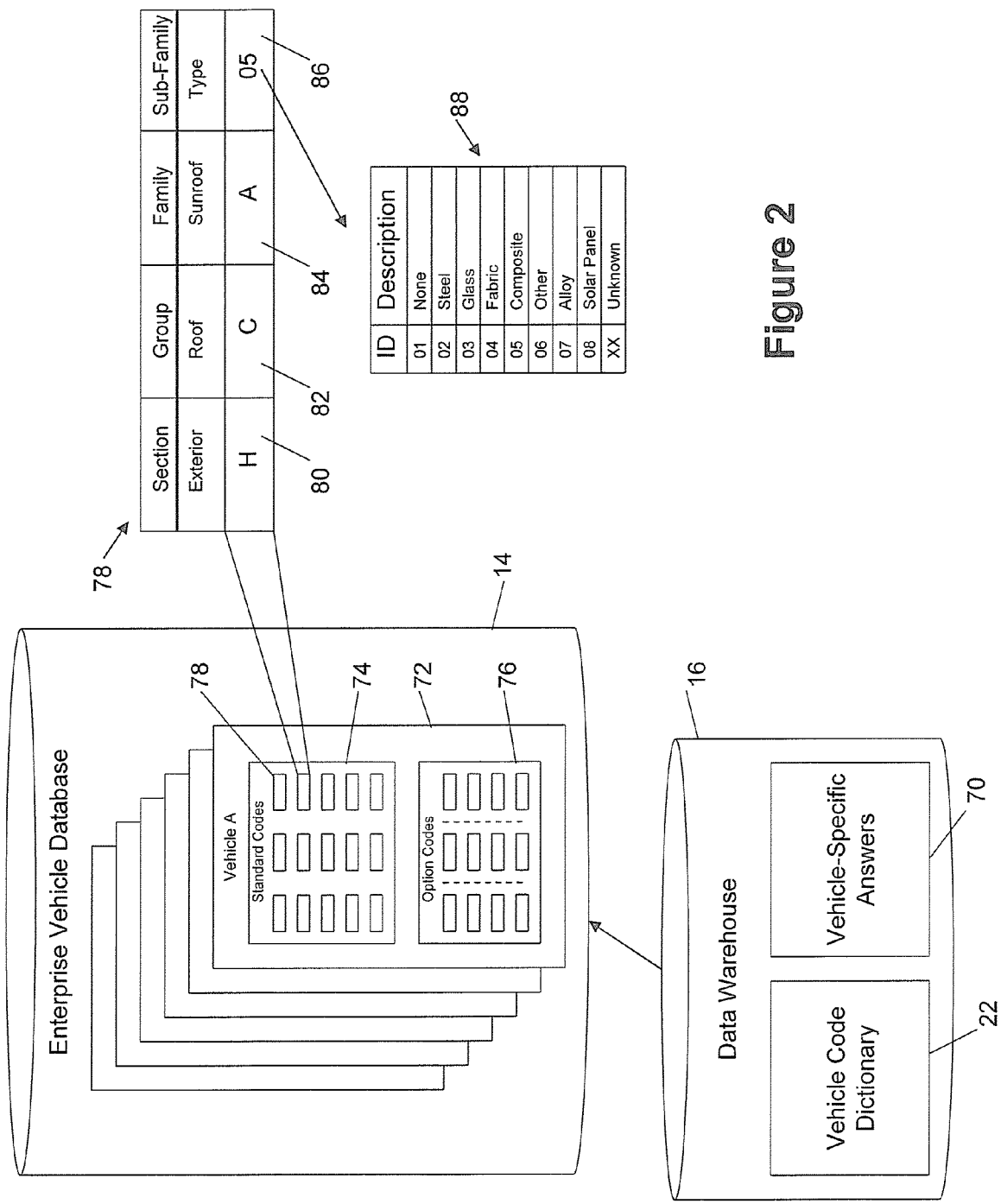
FIG. 2 is a block diagram illustrating one embodiment of an enterprise vehicle database for storing vehicle data obtained from a data warehouse and illustrating an example comparison code pertaining to an attribute of a vehicle.

Turning now to FIG. 2, further detail of the comparison codes 78 is shown. The data warehouse 16 comprises the vehicle code dictionary 22 that, as noted above, comprises a guide to the structure of the comparison codes 78 and the questions that are to be asked for each vehicle. In this example, the vehicle code dictionary 22 at the data warehouse 16 is a master copy that may be updated whenever additional features, options or over parameters describing the vehicle are developed or discovered. The master copy may then be used to distribute updated versions of the code dictionary 22 to the RVE 12, wherever it may be running. The data warehouse 16 also comprises the vehicle-specific answers 88 to the questions posed by each comparison code 78.

The data stored in the data warehouse 16 in this example may be in any format that is suitable to the administrative entity 30 and allows the vehicle data 13 to be stored granularly or atomically. This format may then be converted to something that is more suitable for or compatible with the applications that utilize the RVE 12. The EVD 14 is responsible in this embodiment for storing the vehicle data 13 in a format that is appropriate for such applications. As can be seen in FIG. 2, the EVD 14 stores a vehicle entry 72 for each vehicle for which vehicle data 13 has been generated. Each vehicle entry 72 comprises a first set 74 of standard comparison codes, which describes the standard equipment for the vehicle associated with that entry 72. Each vehicle entry 72 also comprises a second set 76 of option comparison codes, which description the options that may be added to the standard equipment or used to upgrade standard equipment.

Figure 3:
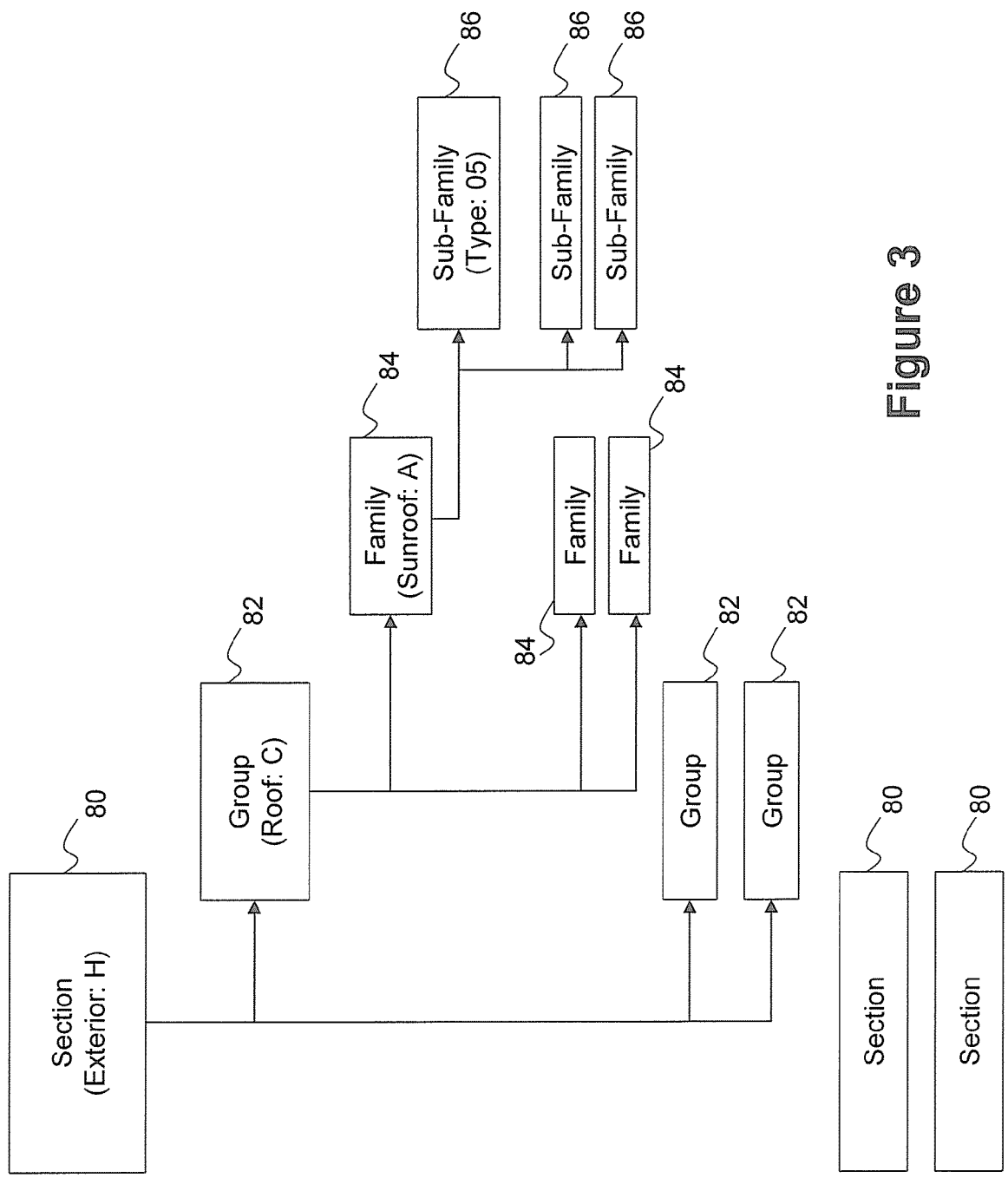
FIG. 3 is a tree diagram illustrating an example naming convention for the comparison codes shown in FIG. 2.

FIG. 2 also shows an example of the structure of a comparison code 78. The comparison code 78 granulates the vehicle data 13 by providing a tree-like structure. The vehicle is broken down into one or more sections 80, e.g. "Exterior" as shown. Other sections may include "Interior", "Mechanical", "Functional" etc. Each section 80, is broken down into one or more groups 82, e.g. "Roof" as shown. Other groups 82 for the "Exterior" section 80 may include "Wheels", "Tires", "Mirrors" etc. Each group 82 is broken down into one or more families 84, e.g. "Sunroof" as shown. Other families 84 for the "Roof" group 82 may include "Convertible Roof", "$2^{nd}$ Row Sunroof" etc. Each family 84 is then broken down into one or more subfamilies 86, e.g. "Type" as shown. Other subfamilies 86 for the "Sunroof" family may include "Location", "Style" etc. Each comparison code 78 has associated therewith one or more possible answers 88, e.g. the 9 answers to the type of sunroof shown in FIG. 2. FIG. 3 illustrates the tree-like structure of the code dictionary 22. It can be seen that at the subfamily level, the vehicle data 13 is very detailed and granular.

In general, there may be two types of comparison codes 78, namely attribute based codes and numeric based codes. Attribute based codes are those that both ask a question and track the available answers 88. FIG. 2 illustrates an example of an attribute based comparison code 78 where there are 9 possible answers 88. In the example shown in FIG. 2, for a glass-type sunroof, the comparison code 78 and answer 88 may be represented by HCA05=03. Since this comparison code 78 is attribute based, the answer "03" needs to be compared to the list of possible answers 88 to ascertain the textual version of the answer 88. There may also be additional properties to an attribute based comparison code 78. For example, each attribute of a comparison code 78 may have properties such as an order (e.g. of importance), absolute advantage of having that feature, relative advantage of that feature to other features, short text description of the feature, long text description of the feature etc. These additional properties may be stored in the data warehouse 16 with the master list of vehicle-specific answers 88.

Numeric based comparison codes 78 are those that do not have a predetermined number of answers 88 but rather require a numeric answer 88. For example, the answer to the number of cylinders may be 6 or 8 or some other number. Numeric based comparison codes 78 may also have additional properties such as a data picture (##.##), a minimum value, a maximum value, a converter, an absolute advantage indicator per unit etc. The data picture represents the format of the number and how many decimal places the number has.

Figure 4:
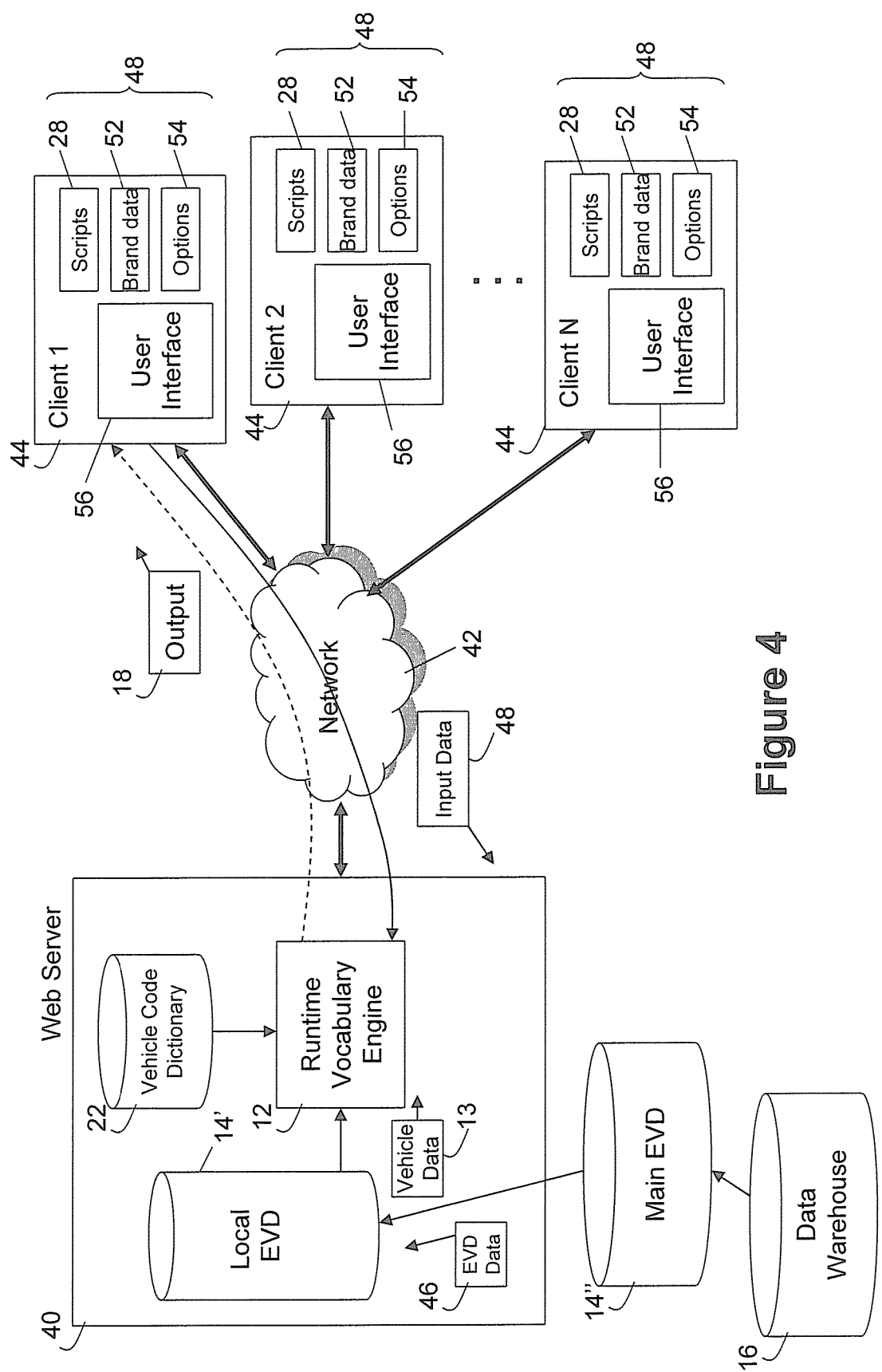
FIG. 4 is a block diagram illustrating one example configuration for implementing the system shown in FIG. 1.

The RVE 12 may be used in various configurations and architectures, examples of which will now be described. FIG. 4 illustrates a configuration where the RVE 12 is hosted by a central web server 40, which may be accessed by multiple clients 44 over a network 42. This configuration may be suitable where multiple car dealerships require use of the RVE 12 each from a separate location, with different scripts 28 being available to (or generated at) each dealership based on the brands and models they sell. The web server 40 in this configuration hosts the RVE 12, stores a copy of the vehicle code dictionary 22 and has a local EVD 14'. The local EVD 14' comprises at least a portion of the vehicle data 13 that is managed by a main EVD 14". This allows, e.g. the administrative entity 30 responsible for maintaining the data warehouse 16 to extract, transform and load (ETL) a set of EVD data 46 that is specific to the format(s) required by the web server 40 and to enable different levels of service and different amounts of data to be obtained at a corresponding cost.

Each client 44 comprises a user interface 56 for an application that uses the RVE 12 to generate an output 18. The client 44 in this case has one or more scripts 28 for generating outputs 18 for corresponding vehicles. The client 44 may also attach additional branding data 52 and specify options 54. The scripts 28, branding data 52 and options 54 are collectively referred to in FIG. 4 as input data 48, which is provided to the RVE 12 at the web server 40 for generating the desired output 18. It can be seen that the output 18 generated by the RVE 12 is then provided to the client 44 for display or other use with the user interface 56.

Figure 5:
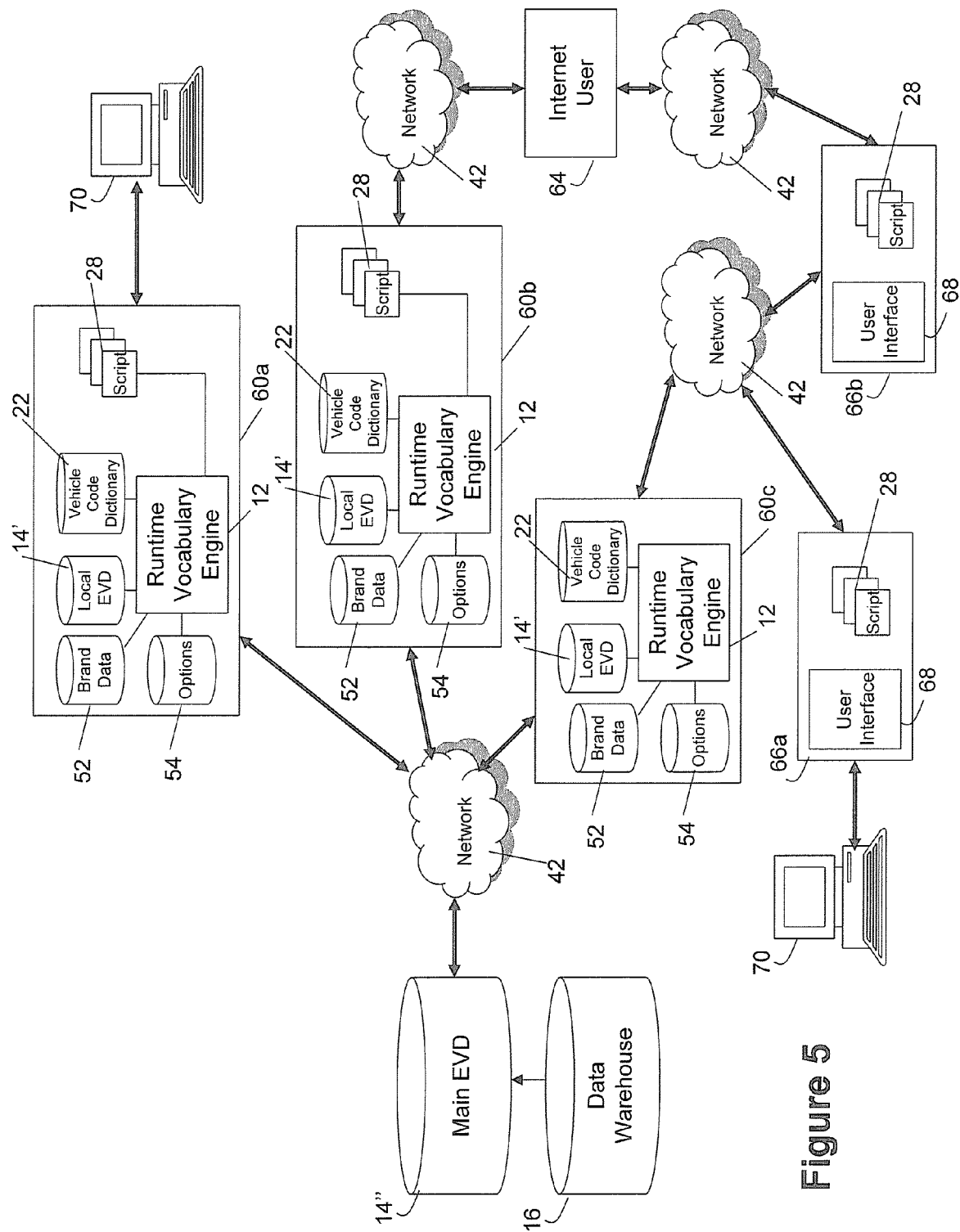
FIG. 5 is a block diagram illustrating additional example configurations for implementing the system shown in FIG. 1.

FIG. 5 illustrates various other configurations with separate client-based RVEs 12 running at separate client sites 60, connected through a network 42 to the main EVD 14", which, similar to FIG. 4, is in turn connected to the data warehouse 16 and managed by the administrative entity 30. A first client site 60a comprises an RVE 12 and comprises the options 54, branding data 52, vehicle code dictionary 22 and one or more scripts 28 for generating corresponding outputs 18. The first client site 60a also comprises a local EVD 14' which comprises vehicle data 13 obtained from the main EVD 14". The first client site 60a exemplifies a local RVE 12 that is used by, e.g. a computing station 70 to generate such outputs 18. The first client site 60a may, for example be a dealership that utilizes vehicle data 13 from the main EVD 14" to generate vehicle descriptions for window stickers and promotional materials, run a vehicle configurator for selling vehicles to customers or any other application that utilizes the output 18.

A second client site 60b comprises the same components as the first client site 60a but is accessible to internet users 64 through the network 42, e.g. through a webpage. In this configuration, the second client site 60b may be used by a car company's website to allow internet users 64 to configure vehicles and obtain vehicle descriptions or other outputs 18 using the RVE 12.

A third client site 60c comprises the same components as the first and second client sites 60a, 60b but does not generate or store the scripts 28. In this example, the third client site 60c provides a server-type service to sub-clients 66 each having a user interface 68 for interacting with the RVE 12 on the third client side 60c and one or more scripts 28 that are used with the RVE 12 by connecting to the third client site 60c through the network 42. In this configuration, a car company could host the third client site 60c to provide vehicle data 13 pertaining to their brands while providing access to multiple dealerships and internet users 64 through various sub-clients 66. For example, it can be seen in FIG. 5 that a dealership may have access to the third client site 60c through a computing station 70 connected to a first sub-client 66a (e.g. local to the dealership) while an internet user 64 could access the RVE 12 at the third client site 60c through a second sub-client 66b (e.g. a website hosted by the car company).

It can therefore be appreciated from FIGS. 4 and 5 that the RVE 12 can be utilized in any configuration that suits a particular application and may be web or network based or client based providing access to different types of users through various interfaces as needed.

As discussed above, the RVE 12 addresses the problem of difficulties in presenting vehicle data 13 in a dynamic, enterprise scalable environment while offering the flexibility of controlling output and the level of detail of the vehicle data 13. The RVE 12 takes advantage of the granular way in which the vehicle data 13 is stored at the data warehouse 16, namely using the comparison codes 78 and through the structure and relationships imposed by the code dictionary 22. Moreover, since the comparison codes 78 enable the vehicle data 13 to be organized and stored for standard and option equipment, vehicle configurations can be generated and modified at runtime as well as net equipment views and other outputs 18 suitable for specific applications. At runtime, the RVE 12 combines the appropriate comparison codes 78 and answers for a specific vehicle with a script 28 that instructs the RVE 12 how to form the output 18 according to the comparison codes 78 as shown in FIG. 1. This allows a client application or other user to control, through scripts 28, the ability to dynamically publish a view of the vehicle data 13 and the corresponding output 18 at runtime.

Examples of what the scripts 28 are capable of include, without limitation: displaying the standard equipment on a vehicle with summary views, detailed views, window sticker views etc.; displaying net equipment views on a vehicle based on selected options 54, again with summary views, detailed views, window sticker views etc; displaying a standard or net comparison of multiple vehicles with low detail, high detail, summaries etc.; displaying textual advantages between two vehicles (recall above that comparison codes 78 can indicate relative and absolute advantages of certain features in a vehicle); and displaying textual advantages between options 54.

Figure 6:
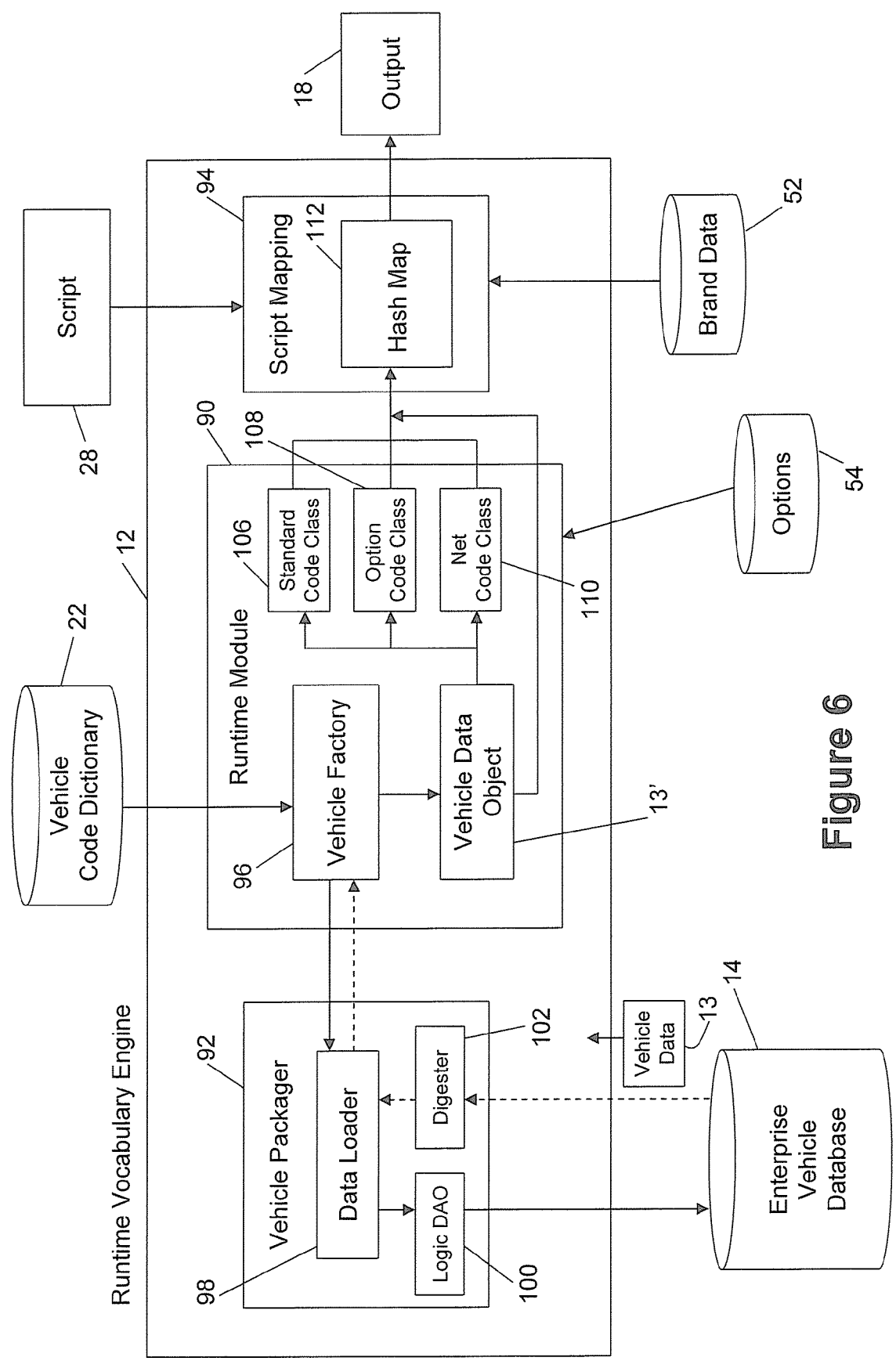
FIG. 6 is a block diagram illustrating one embodiment of the runtime vocabulary engine shown in FIGS. 1, 4 and 5.

The RVE 12 can be used to develop an application such as a web-based or stand-alone application for generating outputs 18 pertaining to selected vehicles. Turning now to FIG. 6, exemplary functional components of the RVE 12 are shown in greater detail to illustrate the interfaces between the RVE 12 and the EVD 14 as well as between the RVE 12 and the application utilizing the RVE 12. The RVE 12 comprises a runtime module 90 which parses vehicle data 13 obtained from the EVD 14 and provides this to a script mapping function 94 for putting together the output 18. The RVE 12 obtains the vehicle data 13 by communicating with a vehicle packager 92. The vehicle packager 92 communicates with the EVD 14 (e.g. local EVD 14' or main EVD 14") to load configuration logic for a specific vehicle.

The vehicle packager 92 comprises a data loader 98 that is instructed by a vehicle factory 96 in the runtime module 90 to obtain specific vehicle data 13 from the EVD 14. The data loader 98 utilizes a logic data access object (DAO) 100, which in this example is a class designed to load a data access object whose role is to obtain data from the physical device at the EVD 14 site. The logic DAO 100 requests data from the EVD 14 as shown in FIG. 6 and the data that is returned by the EVD 14 to the vehicle packager 92 is converted by a digester 102 into an appropriate vehicle data object 13'. The digester 102 parses the incoming data from the EVD 14 and may use any suitable parsing algorithm. For example, the digester 102 may use a document object model (DOM) parser where the data is loaded into an internal DOM and then placed into a vehicle data object 13'. In another example, the digester 102 may implement the parsing algorithm using a simple API for XML (SAX) parser where the data is scanned via the SAX parser and then placed into a vehicle data object 13'. The vehicle factory 96 also accesses the vehicle code dictionary 22, which, as noted above, contains a breakdown of and reference to the comparison codes 78. As noted above, the vehicle code dictionary 22 is used by the RVE 12 (and in this example the vehicle factory 96) to understand the answers to given comparison codes 78. The vehicle code dictionary 22 may be implemented as an object representation of the comparison code data loaded, e.g. via an XML file.

The vehicle code dictionary 22 may also comprise brand data 52, which is loaded with the comparison codes 78. As noted above, the brand data 52 provided by the user/client/application is in addition to the brand data already associated with the comparison codes 78.

In order to interact with the vehicle data object 13', once created, and the comparison codes 78 associated therewith, the runtime module 90 uses a standard code class 106, option code class 108 and net code class 110. The classes 106-110 are script classes that enable the script mapping module 94 to interface and extract data from the vehicle data object 13'. Before discussing the classes 106-110, conversion of data will be discussed. In this example, each comparison code 78 is stored in a default measurement unit, e.g. metric. However, depending on the presentation and the country in which the vehicle data 13 is being used, the output 18 may need to be converted into more appropriate units with the appropriate unit description (e.g. m vs. in). Each script 28 may utilize a list of conversion objects (not shown) to perform conversion operations.

The standard code class 106 is used to expose the standard (default) vehicle answers to the comparison codes 78. The standard code class 106 may comprise various constructors for obtained data pertaining to a standard comparison code 78, examples of which will now be described. A default units constructor may be used to set default units to be used when returning a numeric answer, e.g. metric, imperial, US imperial. A get code constructor may be used to return the answer 88 for the passed comparison code 78 if the comparison code 78 is an attribute based code. For this constructor, if the passed code 78 is numeric, an error value such as "−1" may be returned to indicate as such. Constructors may also be used to return values of the passed comparison codes 78 with the option of converting the returned value into another format, e.g. metric to imperial, metric to US imperial, US imperial to metric, US imperial to imperial etc. as well as converting any given unit to a specified unit, e.g. any unit convert to metric etc. Constructors may also be used to return the short and long text descriptions for the comparison code 78, with or without the associated brand information. Other constructors include those for obtaining the short units and the appropriate unit selection as well as the long units and appropriate unit selection.

As discussed above, each comparison code 78 may be associated with a section 80, group 82, family 84 and sub-family 86. Constructors can also be used to return the section 80, group 82, family 84 and sub-family 86 as well as the textual description therefore and any branding associated with that level in the tree. Relative and absolute advantage information may also be returned using a constructor.

The option code class 108 is similar to the standard code class 106, however looks only at the answers to comparison codes 78 associated with options for a vehicle. Similar constructors as described above can be used for obtaining information using the option code class 108.

Net equipment refers to overriding the answers to the standard equipment with the answers to the option equipment that was selected using the option data 54, to form a net view of the answers. The net code class 110 extends the standard code class 106 and implement the same constructors while returning the net answer rather than the standard answer. When compared to the standard code class 106, the net code class 110 utilizes additional constructors, each providing a different way to pass in the selected options of a vehicle. One additional constructor allows a state string to be passed, which can be obtained from a configuration. Another additional constructor allows a base command result to be passed, which can also be obtained from a configuration. Both the state string and base command constructors are objects that represent the configured state of a vehicle, i.e. which options the user has selected. Yet another additional constructor allows a list of option codes to be passed, which can be obtained from the vehicle data object 13'.

The code classes 106-110 are used to provide a standard, option or net view respectively of all the comparison codes 78. The code classes 106-110 can be used to fully describe a vehicle at any level of detail using values obtained by the code classes 106-110. In order to use the data extracted by the code classes 106-110 the script mapping module 94 is employed, which efficiently stores the comparison codes 78 and associates answers using a hash map 112. The goal of the script mapping module 94 is to combine the answers 88 from the selected comparison codes 78 to form sentences, phrases, paragraphs etc. into a structure that is suitable for the particular application. Other considerations such as business rules may also be used to combine the answers that are written into the script 28 and can be used to add additional brand data 52. The script 28 allows any developer, user, client or application in general to incorporate business rules and other logic into a set of instructions for forming the output 18. The script mapping module 94 is configured to interface with any script engine and thus various formats of scripts 28, i.e. is "script agnostic". This allows the developer/user/client/application to choose a familiar script engine and generate instructions that can be used by the RVE 12 to generate and modify the output 18 at runtime. This flexibility also avoids having to pre-publish outputs in order to determine the accuracy of the script 28, i.e. the output 18 can be generated, the script 28 modified and a new output 18 generated in much less time. In other words, the script mapping module 94 does not require scripts 28 to be "finalized" before running the RVE 12, which enables the RVE 12 to be deployed in multiple configurations serving multiple clients such as web or network based architectures as shown in FIGS. 4 and 5.

Figure 7:
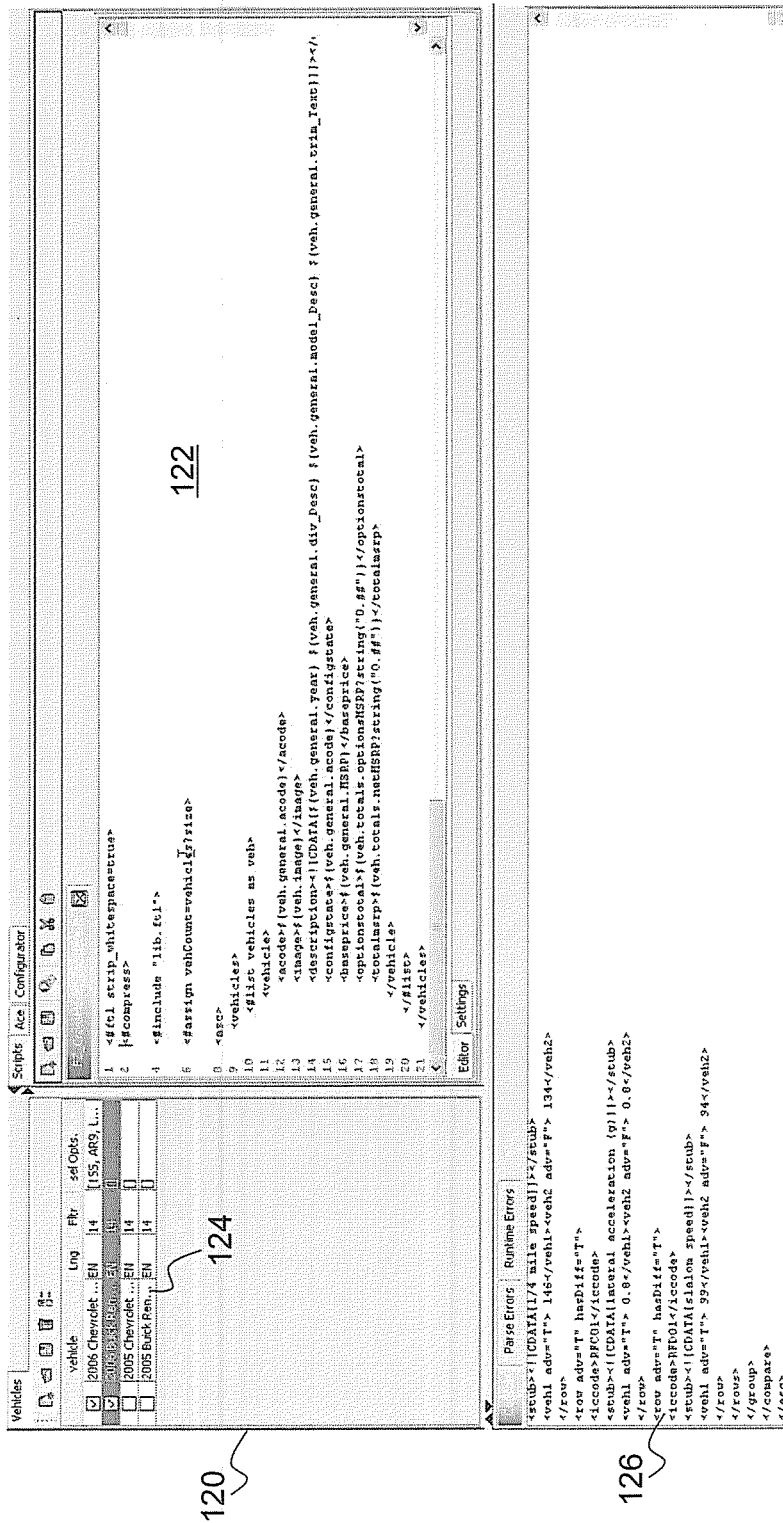
FIG. 7 is an exemplary screen shot of a script generator tool for generating a script for the runtime vocabulary engine.

FIG. 7 illustrates an exemplary screen shot of a user interface for a script editing tool 120, which allows developers, clients or other users to load or create a script 28 in a script window 122 and select a vehicle object 13' from a list 124. An compiler window 126 is also provided for showing errors and compilation statistics.

Figure 8:
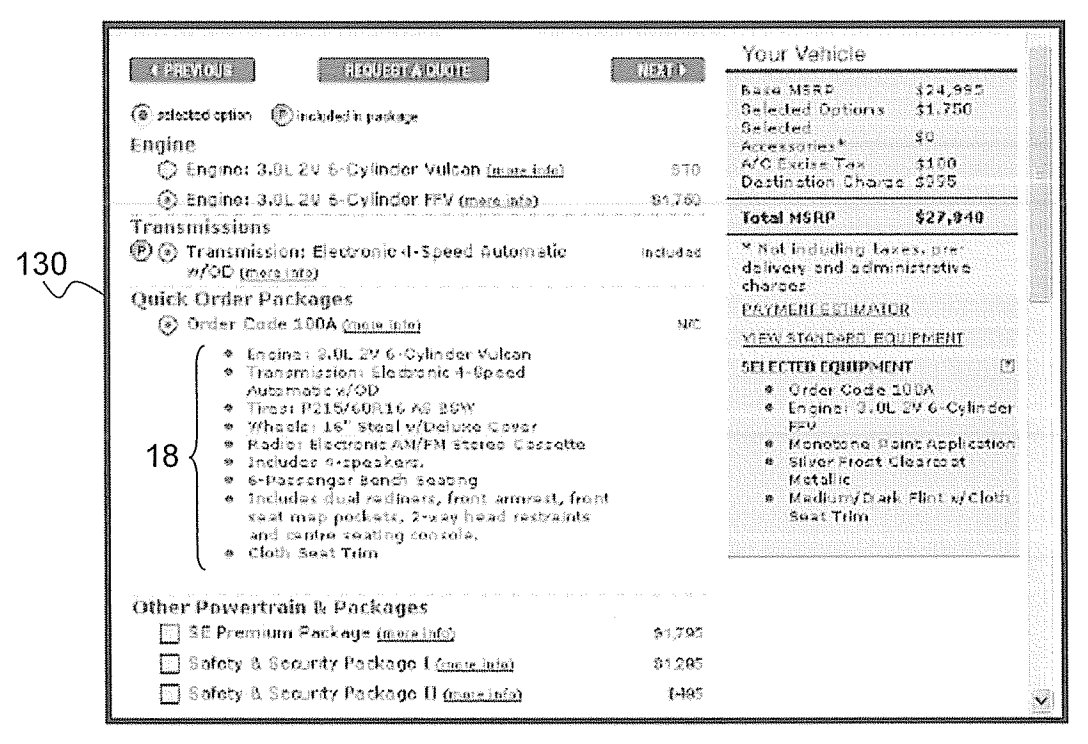

FIG. 8 illustrates an exemplary screen shot of a user interface for a vehicle configuration program 130, which shows an output 18 generated by the RVE 12. It can be seen that the RVE 12 can be used to dynamically generate sentences and other phrases using the data obtained from the answers 88 to the comparison codes 78.

Figure 9:
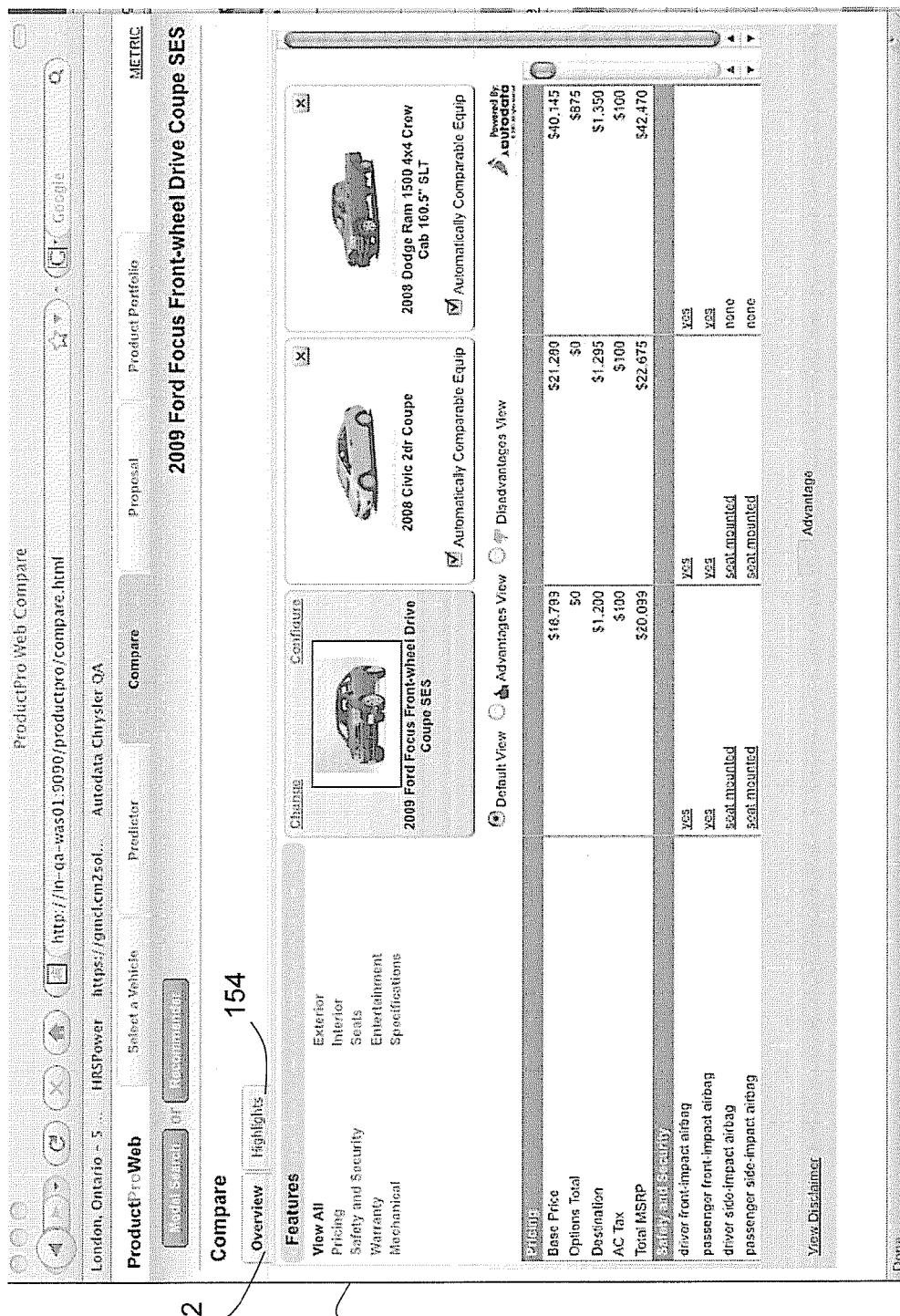
FIG. 9 is a screen shot of a user interface for performing a comparison.
Figure 10:
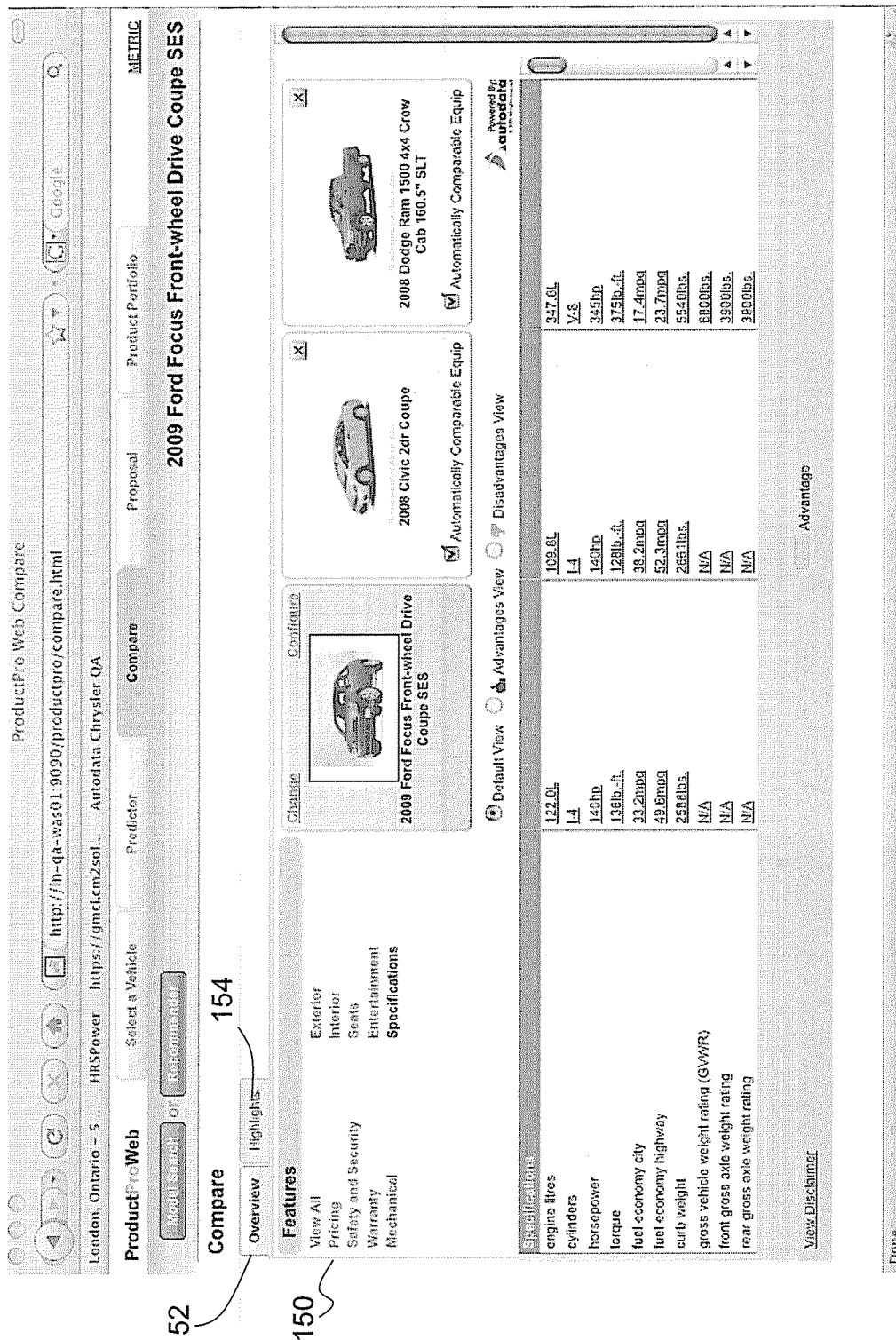
FIG. 10 shows the screen shot of FIG. 9 displaying specifications.
Figure 11:
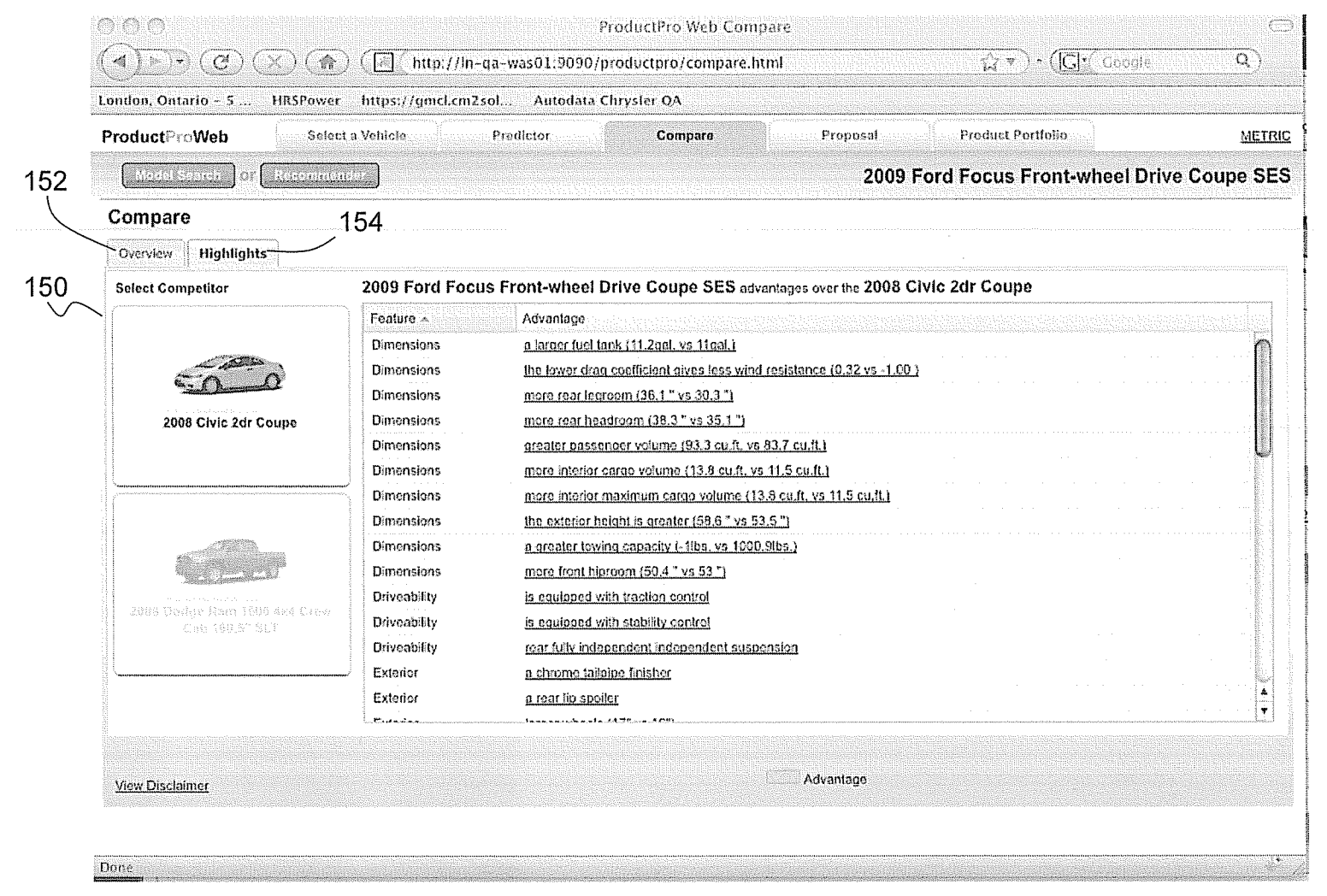

FIGS. 9 through 11 show exemplary screen shots of a user interface for a comparison program 150, which utilizes the RVE 12 for comparing features of one vehicle to another. In FIG. 9, an overview tab 152 is shown providing details of a selected one of the vehicles being compared in a "view all" mode. FIG. 10 shows a "specifications" mode in the overview tab 152 which lists specifications only. Finally, in FIG. 11, a highlights tab 154 is shown in the program 150, which in this example shows the advantages of the selected vehicle over the others in the comparison. It can therefore be seen that the output 18 generated by the RVE 12 enables various programs to be created to not only describe one vehicle but also compare multiple vehicles.

Figure 12:
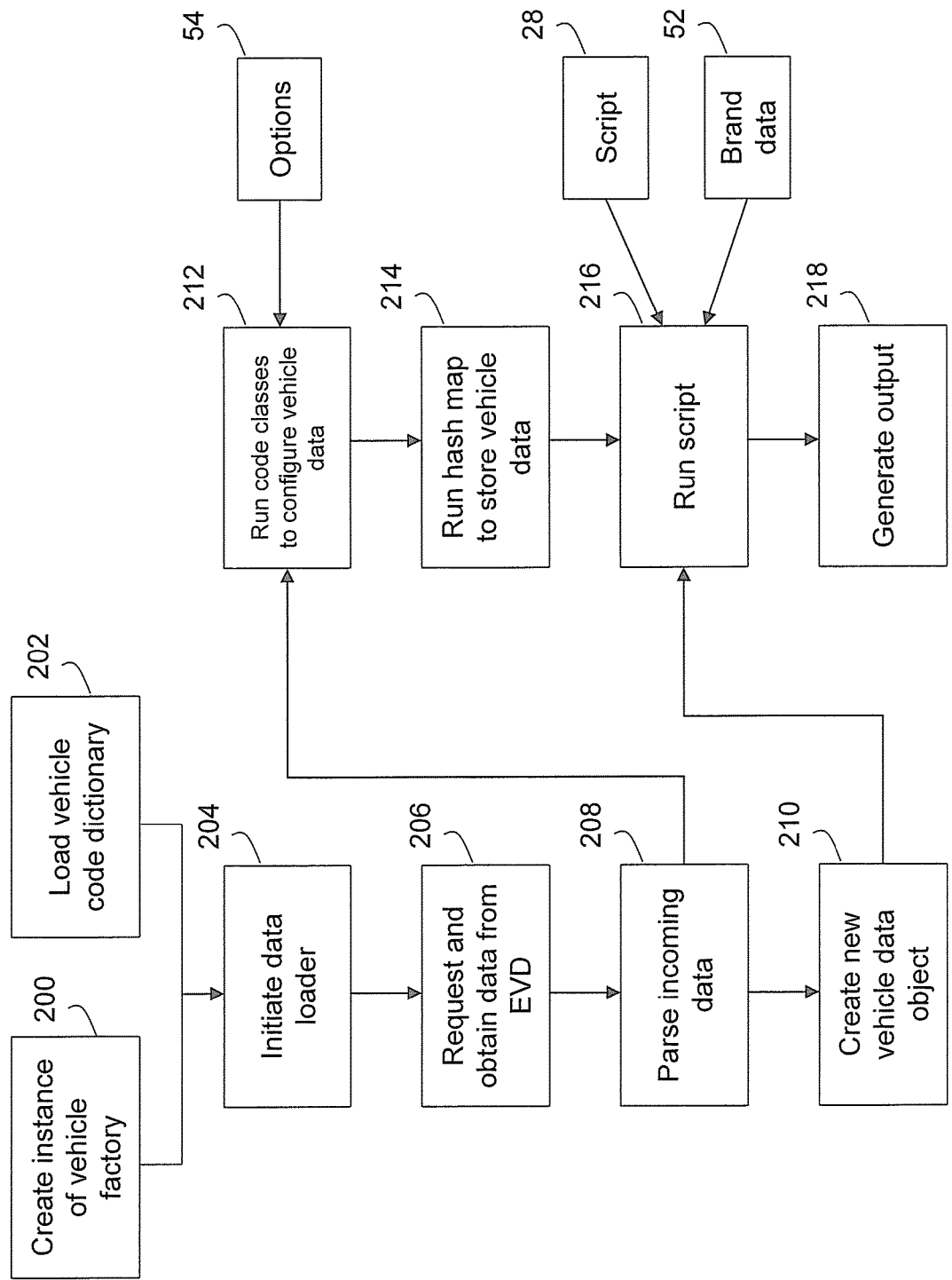
FIG. 12 is a flow diagram illustrating operation of the runtime vocabulary engine.

Turning now to FIG. 12, a flow chart illustrating a set of computer executable operations for generating an output 18 is shown. At 200 the runtime module 90 creates an instance of the vehicle factory 96 in order to obtain data from the EVD 14 and also loads the vehicle code dictionary 22 at 202. The data loader 98 is then initiated at 204 and a request to obtain data from the EVD 14 is generated by referencing the code dictionary 22 and the request is sent to the EVD 14 at 206 using the Logic DAO 100. As discussed above, the digester 102 processes incoming vehicle data 13, which is parsed at 208. The vehicle factory 96 may then create a vehicle data object 13' at 210. the code classes 106-110 are then run at 212 to configure the vehicle data 13, which utilizes selected or specified options 54. The script mapping module 94 then runs the hash map 112 at 214 to store the vehicle data. The stored vehicle data 13 and the new vehicle data object 13' are used to run a script 28 at 216, which may also take into account brand data 52 specified by the user or application. By running the script, the output 18 is generated at 218.

It can therefore be seen that by separating the scripting language from the RVE 12, the RVE 12 is capable of modifying and generating scripts at runtime which provides increased flexibility by allowing any suitable scripting language to be used, and enables the RVE 12 to be deployed in a network or web-based environment in addition to stand-alone configurations. It has also been recognized that the use of hash maps to efficiently store vehicle data that is extracted from a database of vehicle data can improve performance further facilitating the deployment of the RVE 12 in a web-based environment. It has also been recognized that by separating the scripting language from the RVE 12, additional custom variables can be incorporated at runtime enabling net equipment views and the addition of branding information and to incorporate other business requirements.

Although the invention has been described with reference to certain specific embodiments, various modifications thereof will be apparent to those skilled in the art as outlined in the claims appended hereto.

The invention claimed is:

1. A method for generating an output describing one or more vehicles, said method comprising:
   providing a vocabulary engine for dynamically generating said output;
   said vocabulary engine receiving a first request from a client interface to generate said output for said one or more vehicles;
   said vocabulary engine receiving a second request from the client interface for a particular one of a plurality of predefined scripts based on client requirements specified in said second request, each of said plurality of scripts having been generated for different client requirements;
   said vocabulary engine sending a third request, based on said first request, to a data source identifying one or more sets of vehicle data each specifying one or more features of a respective one of said one or more vehicles, said data source individually storing a set of vehicle data for each of a plurality of vehicles in a same format and enabling any one or more sets of vehicle data to be dynamically obtained to accommodate different outputs;
   said vocabulary engine obtaining said one or more sets of vehicle data from said data source according to said third request;
   said vocabulary engine storing said one or more sets of vehicle data in a memory;
   said vocabulary engine generating a fourth request for said particular one of said plurality of predefined scripts based on said client requirements specified in said second request;
   said vocabulary engine obtaining said particular script that is programmed to be executed by said vocabulary engine to generate said output using said one or more data sets, said script including logic defining which features from said one or more data sets are to be included in said output and how to incorporate features selected from said one or more sets of vehicle data into a textual description of one or more vehicles corresponding to said one or more sets of vehicle data;
   said vocabulary engine generating said output by executing said script to determine which features to select from said one or more sets of vehicle data, and incorporating said selected features into said textual description according to said logic; and
   said vocabulary engine providing said output to said client interface in response to said first and second requests.

2. The method according to claim 1, further comprising obtaining brand data to be used by said script in generating said output.

3. The method according to claim 1, further comprising specifying a set of options for at least one of said one or more vehicles, said set of options being related to said vehicle data.

4. The method according to claim 1 wherein said features are stored in said data source using a hash map.

5. The method according to claim 1 wherein said vehicle data is selected according to a vehicle code dictionary comprising a guide to comparison codes pertaining to said features, said comparison codes providing a granular breakdown of said features.

6. The method according to claim 5 wherein said comparison codes are classified according to a tree structure.

7. The method according to claim 6 wherein said tree structure comprises one or more sections, each section comprising one or more groups, each group comprising one or more families and each family comprising one or more sub-families.

8. The method according to claim 7 wherein said comparison codes comprise alphanumeric indicators for said section, said group, said family and said sub-family.

9. The method according to claim 1 wherein said vehicle data is obtained by a web server being remote from said data source.

10. The method according to claim 9 wherein said web server obtains said vehicle data from a local vehicle database, said local vehicle database obtaining one or more portions of said vehicle data from a main vehicle database, said main vehicle database having access to said data source.

11. A non-transitory computer readable medium comprising computer executable instructions for generating an output describing attributes of a one or more vehicles, said computer executable instructions comprising instructions for:
   providing a vocabulary engine for dynamically generating said output;
   said vocabulary engine receiving a first request from a client interface to generate said output for said one or more vehicles;
   said vocabulary engine receiving a second request from the client interface for a particular one of a plurality of predefined scripts based on client requirements specified in said second request, each of said plurality of scripts having been generated for different client requirements;
   said vocabulary engine sending a third request, based on said first request, to a data source identifying one or more sets of vehicle data each specifying one or more features of a respective one of said one or more vehicles, said data source individually storing a set of vehicle data for each of a plurality of vehicles in a same format and enabling any one or more sets of vehicle data to be dynamically obtained to accommodate different outputs;
   said vocabulary engine obtaining said one or more sets of vehicle data from said data source according to said third request;
   said vocabulary engine storing said one or more sets of vehicle data in a memory;
   said vocabulary engine generating a fourth request for said particular one of said plurality of predefined scripts based on said client requirements specified in said second request;

said vocabulary engine obtaining said particular script that is programmed to be executed by said vocabulary engine to generate said output using said one or more data sets, said script including logic defining which features from said one or more data sets are to be included in said output and how to incorporate features selected from said one or more sets of vehicle data into a textual description of one or more vehicles corresponding to said one or more sets of vehicle data;

said vocabulary engine generating said output by executing said script to determine which features to select from said one or more sets of vehicle data, and incorporating said selected features into said textual description according to said logic; and said vocabulary engine providing said output to said client interface in response to said first and second requests.

12. The computer readable medium according to claim 11, further comprising instructions for obtaining brand data to be used by said script in generating said output.

13. The computer readable medium according to claim 11, further comprising instructions for specifying a set of options for at least one of said one or more vehicles, said set of options being related to said vehicle data.

14. The computer readable medium according to claim 11 wherein said features are stored in said data source using a hash map.

15. The computer readable medium according to claim 11 wherein said vehicle data is selected according to a vehicle code dictionary comprising a guide to comparison codes pertaining to said features, said comparison codes providing a granular breakdown of said features.

16. The computer readable medium according to claim 15 wherein said comparison codes are classified according to a tree structure.

17. The computer readable medium according to claim 16 wherein said tree structure comprises one or more sections, each section comprising one or more groups, each group comprising one or more families and each family comprising one or more sub-families.

18. The computer readable medium according to claim 17 wherein said comparison codes comprise alphanumeric indicators for said section, said group, said family and said sub-family.

19. The computer readable medium according to claim 11 wherein said vehicle data is obtained by a web server being remote from said data source.

20. The computer readable medium according to claim 19 comprising instructions for said web server to obtain said vehicle data from a local vehicle database, wherein said local vehicle database obtains one or more portions of said vehicle data from a main vehicle database, said main vehicle database having access to said data source.

* * * * *